Figure 1:
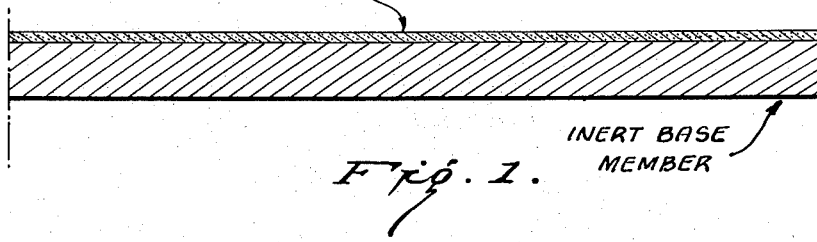

May 17, 1955   J. C. PULLMAN ET AL   2,708,650
METHOD OF LAMINATING USING THERMOPLASTIC ADHESIVE
SURFACE COATING AND ARTICLES PRODUCED THEREBY
Filed Oct. 23, 1951

INVENTORS
JOSEPH C. PULLMAN,
DANIEL D. RITSON,
BY Elizabeth Ann Krider
AGENT

United States Patent Office 2,708,650
Patented May 17, 1955

2,708,650

METHOD OF LAMINATING USING THERMO-PLASTIC ADHESIVE SURFACE COATING AND ARTICLES PRODUCED THEREBY

Joseph C. Pullman, Stamford, and Daniel D. Ritson, Riverside, Conn., assignors to American Cyanamid Company, New York, N. Y., a corporation of Maine Application October 23, 1951, Serial No. 252,721

19 Claims. (Cl. 154—140)

This invention relates to thermoplastic adhesive surface coatings and, more particularly, to surface coatings which can be heat-activated to form strong adhesive bonds.

It is an object of the present invention to provide a coating for a base member which can be heat-activated and thereby made to adhere to another element of the same or different material as the base member.

Another object of the present invention is the provision of a thermoplastic resinous coating which is non-tacky at ordinary temperatures.

A further object of the present invention is a thermoplastic resinous coating which may be applied to a base member in the form of a hot melt.

Still another object of the present invention is to provide a coating for a base member which, upon heat-activation, attains a strong initial tack which is retained for a period of time subsequent to cooling of the coating.

A further object of the present invention is the provision of a "non-blocking" thermoplastic resin coating for paper.

A further object of the present invention is the provision of a base member carrying a non-tacky thermoplastic resinous coating which, upon heat-activation, forms a strong adhesive bond to paper, glass, plastics, wood, cellophane, metal, ceramics, etc.

It is a more specific object of the present invention to provide paper coated with a non-tacky, "non-blocking," thermoplastic resinous coating.

Another object of the present invention is the production of composite articles comprising two or more elements secured together by means of a bonding agent which is a non-tacky thermoplastic resin capable of heat-activation to form a strong adhesive bond.

The above and other objects are attained by coating a base member with a condensation product of a dicarboxylic acid and either a glycol or a monoalkylol amine or a mixture of a glycol and a monoalkylol amine. Such a coated base member, upon heat-activation of the thermoplastic resinous coating, becomes tacky, retains its tackiness for a period of time after the coating has cooled, and may be made to adhere to another element while in the tacky state.

The present application is a continuation-in-part of our parent application, Serial No. 5,108, filed January 29, 1948, now abandoned, and entitled "Thermoplastic Adhesive Surface Coating."

The thermoplastic resinous condensation products which are used in the practice of the present invention should be those which have been permitted to react until a number-average molecular weight of between 800 and 2500 is reached, and preferably to a number-average molecular weight of between 1200 and 1600. This is readily accomplished by continuing the condensation reaction until a desired acid number is reached, such as an acid number between 22.4 for a number-average molecular weight material of 2500, up to an acid number of 70 for a number-average molecular weight material of 800. It has been indicated that the range of number-average molecular weight preferred lies between 1200 and 1600, which corresponds to acid numbers of 45 and 35, respectively. The method for determining these number-average molecular weights is disclosed in "Protective and Decorative Coatings," Mattiello, volume V, pages 122–123, John Wiley & Sons, Inc. (1946), and is set forth in the equation: number-average molecular weight equals $$\frac{56,000}{\text{acid number of resin}}$$

The derivation of the acid number comes from the number of milligrams of potassium hydroxide which are used to neutralize one gram of the resinous material. Since the gram molecular weight of potassium hydroxide is 56, the milligram molecular weight of potassium hydroxide is 56,000 milligrams.

Figure 2:
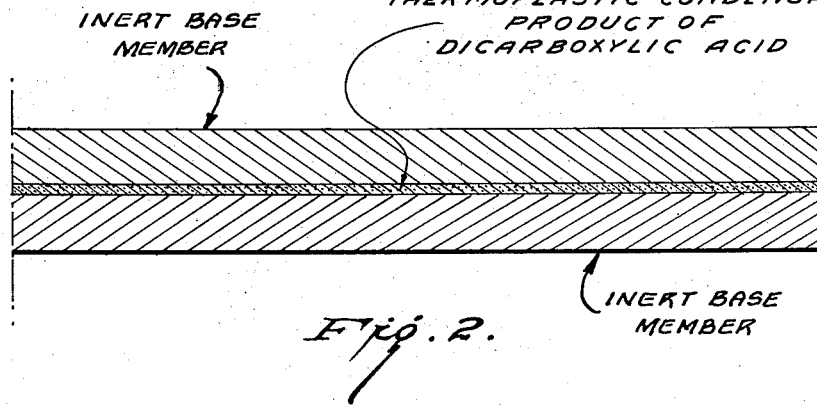

The invention will be more readily comprehended by reference to the accompanying drawing. Figure 1 shows an inert element coated with the condensation product; and Figure 2 discloses an inert element coated with the condensation product bonded to a second inert element.

The invention will be described in greater detail in conjunction with the following specific examples, in which proportions are given in parts by weight. The examples are merely illustrative and it is not intended that the scope of the invention be limited to the details therein set forth.

*Example 1*

62.1 parts of ethylene glycol (1 mol)
202 parts of sebacic acid (1 mol)

The above ingredients are mixed together and heated for 1 hour at 200° C., for 40 minutes from 200–220° C. and for 5½ hours at 220° C. A resinous condensation product having an acid number of from 40 to 45 is obtained. The resinous material thus produced, having an acid number of 45, had a number-average molecular weight of 1200, whereas the resinous material having an average acid number of 40, had a number-average molecular weight of 1400.

Paper is coated with the condensation product described above in the form of a hot melt. After heat-activation of the coating at about 200–250° F., a "tack delay" (measured from immediately after heat is withdrawn) of about 10–20 seconds at room temperature is observed. During this period the coated paper may be made to adhere strongly to glass.

A glass surface is coated with an excess of the condensation product described above, clamped in contact with another glass surface, and the assembly placed in an oven at about 200–250° F. After the condensation product has become heat activated, the assembly is removed from the source of heat and allowed to cool. A glass-to-glass bond exhibiting a relatively high compression shear results.

Samples of paper coated with the resin prepared as described above are stacked and subjected to a pressure of 10 lbs./sq.in. at 150° F. The coatings do not become tacky, nor do they penetrate the paper, i. e., they are "non-blocking."

*Example 2*

61.1 parts of monoethanol amine (1 mol)
202.2 parts of sebacic acid (1 mol)

The above ingredients are heated together for 4¼ hours at 190° C. to an acid number between 35 and 45. The resinous material having an acid number of 35 would have a number-average molecular weight of 1600, and the resinous material having an acid number of 45 would have a number-average molecular weight of 1200. Paper is coated with the above resin in the form of a hot melt and the resulting non-tacky coating, after activation with heat at about 250–300° F., exhibits a "tack delay" of 80 seconds at room temperature, and the coated paper forms an excellent adhesive bond to glass. The resin is found to be "non-blocking" when subjected to the block test as described in the final paragraph of Example 1.

Black iron-to-black iron, aluminum-to-aluminum and copper-to-copper bonds by means of the resin described above applied according to the procedure set forth in Example 1 exhibit high tensile shear strength, while a similarly produced glass-to-glass bonded article is found to possess a high compression shear.

*Example 3*

62.1 parts of ethylene glycol (1 mol)
118.1 parts of succinic acid (1 mol)

The above ingredients are heated together to an acid number of 32 for 1 hour from 200–220° C. and for 3¾ hours at 220° C. This resinous composition with an acid number of 32 has a number-average molecular weight of 1700.

Paper is coated with the resin prepared as described above in the form of a hot melt, and after heat-activation of the coating at about 200–250° F., a "tack delay" of about 2–3 minutes at room temperature is observed.

The resin above-described provides a good glass-to-glass adhesive bond when applied according to the procedure of Example 1, the compression shear of such a bond being relatively high. This adhesion is still good after standing for 10 days at 5° C.

Samples of paper coated with the resin prepared as described above are stacked and subjected to a pressure of 10 lbs./sq.in. at 150° F. The coatings do not become tacky, nor do they penetrate the paper, i. e., they are "non-blocking."

*Example 4*

62.1 parts of ethylene glycol (1 mol)
146.1 parts of adipic acid (1 mol)

The above ingredients are heated together for 1½ hours at 200° C., for 1 hour at 210° C. and for 5½ hours at 220° C. The condensation product obtained has an acid number of 35. The resinous material thus produced with an acid number of 35 has a number-average molecular weight of 1600.

Paper is coated with a hot melt of the ethylene glycol adipate polyester prepared as described above, and a smooth non-tacky coating results. Heat activation of the coating at about 200–250° F. renders the coating tacky, it retains this tackiness for a matter of minutes at ordinary room temperatures, i. e., it has a "tack delay" of about 12 minutes, and it is found to possess good adhesion to glass.

*Example 5*

404.4 parts of sebacic acid (2 mols)
61.1 parts of monoethanol amine (1 mol)
62.1 parts of ethylene glycol (1 mol)

The above ingredients are heated together at 200° C. for 5 hours and at 220° C. for 2 hours.

When paper coated with the prepared resin as described above in the form of a hot melt is subjected to a block test at 10 lbs./sq.in. at 150° F., the resinous coating is found to be "non blocking." After heat activation at about 250–300° F., a "tack delay" of 70–75 seconds at room temperature is observed, and adhesion of the coated paper to glass is good.

*Example 6*

202.2 parts of sebacic acid (1 mol)
51.9 parts of monoethanol amine (0.85 mol)
10.5 parts of diethanol amine (0.1 mol)

The monoethanol amine and sebacic acid are heated for 3½ hours at 190° C. The pressure is then reduced to 10 mm. and the temperature raised to 200° C. for 9 hours. The diethanol amine is then added and the heating continued at 200° C. and 10 mm. pressure for 20 minutes.

Paper is coated with the resin, prepared as described above, in the form of a hot melt. The resin coating is found to be "non-blocking" when subjected to a block test of 10 lbs./sq.in. at 150° F. and to have a "tack delay" of 70–90 seconds at room temperature after heat activation at about 250–300° F. Adhesion of the coated paper to glass is excellent.

*Example 7*

202.2 parts of sebacic acid (1 mol)
30.6 parts of monoethanol amine (0.5 mol)
34.2 parts of 1,2-propylene glycol (0.45 mol)
4.61 parts of glycerol (0.05 mol)

The above ingredients are heated together at about 200° C. to acid number of 35 to 45, the product exhibiting adhesive properties similar to those of the preceding examples. The resinous material having an acid number of 35 has a number-average molecular weight of 1600, whereas the resinous material having an acid number of 45, has a number-average molecular weight of 1200. If one had so desired, one could have stopped the reaction at an acid number of 55, in which event the number-average molecular weight would have been 1000.

The present invention is intended to cover those thermoplastic resinous condensation products which may be applied to a base member as a hot melt to form a non-tacky coating thereon, the coating upon activation with heat becoming tacky and retaining this tackiness for a period of time after cooling. In the tacky state the condensation products are capable of forming strong adhesive bonds. We have found that resinous condensation products which exhibit the desired properties are obtained by reaction of a saturated, aliphatic, straight-chain dicarboxylic acid having at least four carbon atoms with a monoalkylene glycol having from two to four carbon atoms and at least one primary hydroxyl group, or with a monoalkylol amine having from two to four carbon atoms and at least one primary functional group, i. e., a primary hydroxyl group or a primary amino group, or with a mixture of the two. The suitable monoalkylene glycols and monoalkylol amines may thus be represented by the following general formula:

$$HO(C_nH_{2n})CH_2OH, \quad HO(C_nH_{2n})CH_2NH_2$$

and $H_2N(C_nH_{2n})CH_2OH$ in which $n$ is an integer of from 1–3.

Suitable dicarboxylic acids include succinic acid, glutaric acid, adipic acid, pimelic acid, suberic acid, azelaic acid, sebacic acid, decamethylene dicarboxylic acid, duodecamethylene dicarboxylic acid, octadecanedioic acid, and the like. In order to be operative, the saturated, aliphatic, straight-chain dicarboxylic acid must have at least four carbon atoms. There is no corresponding upper limit on the number of carbon atoms, although practical considerations of availability and cost will generally dictate the use of an acid ranging from four to twelve carbon atoms. Obviously, mixtures of different dicarboxylic acids may be used.

The glycols which are suitable for use in the present invention include only those having an uninterrupted carbon chain. Polyglycols such as diethylene glycol and the like are unsuitable as the condensation products obtained therefrom are too soft to possess the desired adhesive characteristics. Monoalkylene glycols having from two to four carbon atoms and at least one primary hydroxyl group may be used. Included are ethylene glycol, 1,2-propylene glycol, 1,3-propylene glycol, 1,2-butylene glycol, 1,3-butylene glycol and 1,4-butylene glycol. Obviously, mixtures of more than one glycol falling within the above group may be used.

Monoalkylol amines having from two to four carbon atoms and at least one primary functional group, i. e., either a primary hydroxyl group or a primary amino group, include the following: monoethanol amine, 1-amino-2-hydroxy propane, 1-amino-3-hydroxy propane, 1-hydroxy-2-amino propane, 1-amino-2-hydroxy butane, 1-amino-3-hydroxy butane, 1-amino-4-hydroxy butane, 1-hydroxy-2-amino butane, 1-hydroxy-3-amino butane. We prefer, however, to use those monoalkylol amines which contain no branched carbon chains. Obviously, mixtures of more than one of the monoalkylol amines selected from the above group may be used.

Stoichiometric proportions of dicarboxylic acid and glycol and/or alkylol amine should be used. In other words, for each amino and/or hydroxyl group in the glycol and/or alkylol amine, there should be present in the reaction mixture one carboxyl group. Since the condensation product used for coating a base member should be essentially a condensation product of only di-functional compounds, equimolar quantities of the acid and glycol or alkylolamine will generally be used. If desired, however, the condensation products may be modified with small amounts of mono- or poly-functional acids or glycols or alkylol amines such as glycerol, diethanol amine, phthalic acid, lauric acid, pentaerythritol, triethanol amine, and the like. No more than one-tenth of a mole of other than di-functional compound should be used per mole of dicarboxylic acid, and the balance between total carboxyl and total hydroxyl and/or amino groups should be maintained.

The thermoplastic resinous condensation products used in the present invention exhibit excellent adhesion to a wide variety of base members. These include paper, cellophane, fibers and fabrics, glass, ceramic surfaces, natural and synthetic resins, wood, metal and the like. By means of the present invention it is possible to bond glass to glass, paper to glass, paper to cellophane, paper to wood, wood to wood, metal to metal, paper to metal, and the like. The base members mentioned are, of course, all elements which do not react with the thermoplastic resinous condensation products and which are not affected by the high temperatures, i. e., 200–300° F., to which they are subjected for the short period of time required for heat activation of the resinous coatings; these base members or elements may thus be termed "inert."

It is an advantage of the present invention that the coated members contemplated may be prepared simply by application to the members of the thermoplastic resinous condensation product in the form of a hot melt.

It is a further advantage of the present invention that the coated members having a smooth, glossy, non-tacky thermoplastic resinous coating may be produced.

Still another advantage of the present invention resides in the so-called "tack delay" of the resinous coating. The condensation products contemplated by the present invention become tacky upon activation with heat, and this tackiness is retained for a reasonable working period after cooling of the resin. The "tack delay" may vary anywhere from about 10 seconds to a matter of minutes or even hours, but the preferred compositions generally exhibit a "tack delay" of from about 15 seconds to 1 minute at room temperature.

A further advantage of the present invention is the extreme strength of the adhesive bond formed after the resinous condensation product has set from the tacky to the non-tacky state. For example, with paper bonded to glass, the adhesive bond is strong enough to pull paper fibers if any attempt is made to separate the elements. Moreover, an adhesive bond between two glass surfaces holds while one of the elements shatters upon exertion of pressure to separate them.

If desired, the condensation products disclosed as suitable for use in the present invention may be purified by recrystallization from a suitable organic solvent such as toluol, xylol, formamide, ethyl acetate, etc., before application to the base member in question.

The present invention is particularly applicable to the labelling of metal cans, wooden crates, paper cartons, glass bottles, etc. As a result of the application of the present invention to the labelling industry, great advances in the art should be possible.

We claim:

1. An inert base member having a coating consisting of a non-tacky heat activatible thermoplastic resin crystallized from its molten state, which resin is a condensation product obtained by heating a mixture consisting of stoichiometric proportions of at least one saturated, aliphatic, straight-chain dicarboxylic acid having at least four carbon atoms and at least one member selected from the group consisting of compounds represented by the following formula: $HO(C_nH_{2n})CH_2OH$ in which $n$ is an integer of from 1–3, inclusive, monoethanol amine, 1-amino-2-hydroxy propane, 1-amino-3-hydroxy propane, 1-hydroxy-2-amino propane, 1-amino-2-hydroxy butane, 1-amino-3-hydroxy butane, 1-amino-4-hydroxy butane, 1-hydroxy-2-amino butane, 1-hydroxy-3-amino butane and 1-hydroxy-2-methyl-3-amino propane, said resin being transformed upon application of heat of from 200° F. to 300° F. to a tacky state which is retained for a period of time subsequent to cooling of said resin, and said resin having a number-average molecular weight of between 800 and 2500, inclusive.

2. Paper coated solely with a non-tacky, heat activatible condensation product crystallized from its molten state of stoichiometric proportions of a saturated, aliphatic, straight-chain dicarboxylic acid having at least four carbon atoms and a member selected from the group consisting of compounds represented by the following formula: $HO(C_nH_{2n})CH_2OH$ in which $n$ is an integer of from 1–3, inclusive, monoethanol amine, 1-amino-2-hydroxy propane, 1-amino-3-hydroxy propane, 1-hydroxy-2-amino propane, 1-amino-2-hydroxy butane, 1-amino-3-hydroxy butane, 1-amino-4-hydroxy butane, 1-hydroxy-2-amino butane, 1-hydroxy-3-amino butane and 1-hydroxy-2-methyl-3-amino propane, said condensation product being transformed upon application of heat of from 200° F. to 300° F. to a tacky state which is retained for a period of time subsequent to cooling of said resin, and said resin having a number-average molecular weight of between 800 and 2500, inclusive.

3. Paper coated in accordance with claim 2 with a condensation product of sebacic acid and ethylene glycol.

4. Paper coated according to claim 2 with a condensation product of sebacic acid and monoethanol amine.

5. Paper coated according to claim 2 with a condensation product of succinic acid and ethylene glycol.

6. An article comprising two inert elements bonded together solely with a non-tacky, heat activatible condensation product crystallized from its molten state of stoichiometric proportions of a saturated, aliphatic, straight-chain dicarboxylic acid having at least four carbon atoms and a member selected from the group consisting of compounds represented by the following formula:

$$HO(C_nH_{2n})CH_2OH$$

in which $n$ is an integer of from 1–3, inclusive, monoethanol amine, 1-amino-2-hydroxy propane, 1-amino-3-hydroxy propane, 1-hydroxy-2-amino propane, 1-amino-2-hydroxy butane, 1-amino-3-hydroxy butane, 1-amino-4-hydroxy butane, 1-hydroxy-2-amino butane, 1-hydroxy-3-amino butane and 1-hydroxy-2-methyl-3-amino propane, wherein said resin has a number average molecular weight of between 800 and 2500, inclusive.

7. An article according to claim 6 in which one of the elements is paper.

8. An article according to claim 6 in which two elements are bonded together with a condensation product of sebacic acid and ethylene glycol.

9. An article according to claim 6 in which two elements are bonded together with a condensation product of sebacic acid and monoethanol amine.

10. An article according to claim 6 in which paper is bonded to glass.

11. A process which comprises coating an inert base member with a hot melt consisting of a condensation product of stoichiometric proportions of a saturated, aliphatic, straight-chain dicarboxylic acid having at least four carbon atoms and a member selected from the group consisting of compounds represented by the following formula: $HO(C_nH_{2n})CH_2OH$ in which $n$ is an integer of from 1–3, inclusive, monoethanol amine, 1-amino-2-hydroxy propane, 1-amino-3-hydroxy propane, 1-hydroxy-2-amino propane, 1-amino-2-hydroxy butane, 1-amino-3-hydroxy butane, 1-amino-4-hydroxy butane, 1-hydroxy-2-amino butane, 1-hydroxy-3-amino butane and 1-hydroxy-2-methyl-3-amino propane, and allowing the resulting molten coating to cool to a non-tacky form, wherein said resin has a number-average molecular weight of between 800 and 2500, inclusive.

12. A process which comprises coating an inert base member with a hot melt consisting of a condensation product of stoichiometric proportions of a saturated, aliphatic, straight-chain dicarboxylic acid having at least four carbon atoms and a member selected from the group consisting of compounds represented by the following formula: $HO(C_nH_{2n})CH_2OH$ in which $n$ is an integer of from 1–3, inclusive, monoethanol amine, 1-amino-2-hydroxy propane, 1-amino-3-hydroxy propane, 1-hydroxy-2-amino propane, 1-amino-2-hydroxy butane, 1-amino-3-hydroxy butane, 1-amino-4-hydroxy butane, 1-hydroxy-2-amino butane, 1-hydroxy-3-amino butane and 1-hydroxy-2-methyl-3-amino propane, allowing the resulting coating to cool to a non-tacky form, transforming said coating by application of heat of from 200° F. to 300° F. to a tacky state, placing said coated base member in contact with an inert element, to which it is desired to adhere the base material, during a period of time subsequent to heat-activation of said coating, within which the coating retains its tackiness, and allowing said condensation product to set, thereby forming a strong adhesive bond between said base member and said element, and wherein said resin has a number-average molecular weight of between 800 and 2500, inclusive.

13. Paper coated solely with a non-tacky, heat activatible condensation product crystallized from its molten state of stoichiometric proportions of a saturated, aliphatic, straight-chain dicarboxylic acid having at least four carbon atoms and a member selected from the group consisting of compounds represented by the following formula: $HO(C_nH_{2n})CH_2OH$ in which $n$ is an integer of from 1–3, inclusive, monoethanol amine, 1-amino-2-hydroxy propane, 1-amino-3-hydroxy propane, 1-hydroxy-2-amino propane, 1-amino-2-hydroxy butane, 1-amino-3-hydroxy butane, 1-amino-4-hydroxy butane, 1-hydroxy-2-amino butane, 1-hydroxy-3-amino butane and 1-hydroxy-2-methyl-3-amino propane, said condensation product being transformed upon application of heat of from 200° F. to 300° F. to a tacky state which is retained for a period of time subsequent to cooling of said resin, and said resin having a number-average molecular weight of between 1200 to 1600, inclusive.

14. Paper coated in accordance with claim 13 with a condensation product of sebacic acid and ethylene glycol.

15. Paper coated according to claim 13 with a condensation product of sebacic and monoethanol amine.

16. Paper coated according to claim 13 with a condensation product of succinic acid and ethylene glycol.

17. An article comprising two inert elements bonded together solely with a condensation product crystallized from its molten state of stoichiometric proportions of a saturated, aliphatic, straight-chain dicarboxylic acid having at least four carbon atoms and a member selected from the group consisting of compounds represented by the following formula: $HO(C_nH_{2n})CH_2OH$ in which $n$ is an integer of from 1–3, inclusive, monoethanol amine, 1-amino-2-hydroxy propane, 1-amino-3-hydroxy propane, 1-hydroxy-2-amino propane, 1-amino-2-hydroxy butane, 1-amino-3-hydroxy butane, 1-amino-4-hydroxy butane, 1-hydroxy-2-amino butane, 1-hydroxy-3-amino butane and 1-hydroxy-2-methyl-3-amino propane, wherein said resin has a number-average molecular weight of between 1200 and 1600, inclusive.

18. A process which comprises coating an inert base member with a hot melt consisting of a condensation product of stoichiometric proportions of a saturated, aliphatic, straight-chain dicarboxylic acid having at least four carbon atoms and a member selected from the group consisting of compounds represented by the following formula: $HO(C_nH_{2n})CH_2OH$ in which $n$ is an integer of from 1–3, inclusive, monoethanol amine, 1-amino-2-hydroxy propane, 1-amino-3-hydroxy propane, 1-hydroxy-2-amino propane, 1-amino-2-hydroxy butane, 1-amino-3-hydroxy butane, 1-amino-4-hydroxy butane, 1-hydroxy-2-amino butane, 1-hydroxy-3-amino butane and 1-hydroxy-2-methyl-3-amino propane, and allowing the resulting molten coating to cool to a non-tacky form, wherein said resin has a number-average molecular weight of between 1200 and 1600, inclusive.

19. A process which comprises coating an inert base member with a hot melt consisting of a condensation product of stoichiometric proportions of a saturated, aliphatic, straight-chain dicarboxylic acid having at least four carbon atoms and a member selected from the group consisting of compounds represented by the following formula: $HO(C_nH_{2n})CH_2OH$ in which $n$ is an integer of from 1–3, inclusive, monoethanol amine, 1-amino-2-hydroxy propane, 1-amino-3-hydroxy propane, 1-hydroxy-2-amino propane, 1-amino-2-hydroxy butane, 1-amino-3-hydroxy butane, 1-amino-4-hydroxy butane, 1-hydroxy-2-amino butane, 1-hydroxy-3-amino butane and 1-hydroxy-2-methyl-3-amino propane, allowing the resulting coating to cool to a non-tacky, heat activatible form, transforming said coating by application of heat of from 200° F. to 300° F. to a tacky state, placing said coated base member in contact with an inert element, to which it is desired to adhere the base material, during a period of time subsequent to heat-activation of said coating, within which the coating retains its tackiness, and allowing said condensation product to set, thereby forming a strong adhesive bond between said base member and said element, and wherein said resin has a number-average molecular weight of between 1200 and 1600, inclusive.

References Cited in the file of this patent

UNITED STATES PATENTS

| | | |
|---|---|---|
| 2,147,772 | Kallander | Feb. 21, 1939 |
| 2,443,613 | Fuller | June 22, 1948 |
| 2,445,553 | Beavers | July 20, 1948 |